United States Patent
Foote

(10) Patent No.: US 11,599,961 B1
(45) Date of Patent: Mar. 7, 2023

(54) ESTATE PLANNING AND BENEFICIARY MANAGEMENT SYSTEM INCLUDING DIGITAL ASSETS

(71) Applicant: Legacy Suite, Inc, Lithonia, GA (US)

(72) Inventor: Sean Foote, Lithonia, GA (US)

(73) Assignee: Legacy Suite Inc, Lithonia, GA (US)

( * ) Notice: Subject to any disclaimer, the term of this patent is extended or adjusted under 35 U.S.C. 154(b) by 0 days.

(21) Appl. No.: 17/854,366

(22) Filed: Jun. 30, 2022

(51) Int. Cl.
*G06Q 20/00* (2012.01)
*G06Q 50/18* (2012.01)
*G06Q 20/38* (2012.01)
*G06Q 20/36* (2012.01)

(52) U.S. Cl.
CPC ....... *G06Q 50/186* (2013.01); *G06Q 20/3674* (2013.01); *G06Q 20/3829* (2013.01); *G06Q 2220/00* (2013.01)

(58) Field of Classification Search
CPC ............. G06Q 50/186; G06Q 20/3674; G06Q 20/3829; G06Q 2220/00
USPC .......................... 705/16, 21, 59; 380/44, 262
See application file for complete search history.

(56) References Cited

U.S. PATENT DOCUMENTS

| | | | | |
|---|---|---|---|---|
| 2007/0250920 A1* | 10/2007 | Lindsay | ................. | G06F 21/31 726/7 |
| 2018/0097902 A1* | 4/2018 | Meixner | ............... | G06F 3/0481 |
| 2021/0327008 A1* | 10/2021 | Salah | ....................... | G06F 8/38 |

* cited by examiner

*Primary Examiner* — Dante Ravetti
(74) *Attorney, Agent, or Firm* — Kenyon Jenckes

(57) ABSTRACT

A estate planning and beneficiary management system according to an embodiment includes a system controller which may prompt and receive from a user information which may be necessary to create and estate planning model. The system may provide for traditional assets and digital assets, such as cryptocurrency and NFTs. The system may provide for distribution of the digital assets using smart contracts and blockchain wallets. The system may provide access by beneficiaries and trusted contacts to the user selected documents at different user defined permission levels. Upon the user's death, the system may automatically notify the beneficiaries and trusted contacts, execute block transactions between the user's wallets and beneficiaries' wallets according to the smart contracts, and notify outside world platforms of the user's death and the user's directives for the particular platforms as laid out in the user's will.

12 Claims, 9 Drawing Sheets

ESTATE PLANNING AND BENEFICIARY MANAGEMENT SYSTEM INCLUDING DIGITAL ASSETS

TECHNICAL FIELD

The technical field of the disclosed embodiments relate to digital estate planning. More particularly, the disclosed embodiments relate to estate planning and beneficiary management systems that handle digital assets as well as more traditional asset distribution.

BACKGROUND

Traditional estate planning may seem daunting to someone looking to draft a will (testator) and to create a plan to handle other factors surrounding the end of their life and secure their legacy. Different aspects of end of life planning may be decentralized, being handled by different agencies/entities, and multiple intermediaries, for example, banks, attorneys, fiduciaries (trustees, executors), life insurance companies, etc.

Also, the state of a person's estate will likely change significantly over the life of the estate plan, for example, due to changes is asset portfolios, health insurance policies, marriages and divorces, deaths and births of people close to the person, and laws, for example, tax considerations, which may change over time, and differences due to the testator moving to a different state or country. Furthermore, over time physical assets may be acquired, sold or donated, or lost, and investment portfolios may increase or decrease in value.

With the emergence of the digital revolution, many of the things that people own and consume aren't tangible. These include digital assets and accounts such as such as cryptocurrency, non-fungible tokens (NFTs), online banking accounts, social media accounts, email accounts, subscription service accounts, etc.

There is a need to include digital estate planning considerations to the traditional estate planning model. The elements required for planning for the distribution of digital assets should include provisions for identifying and accessing digital assets and accounts. Such a system should include the ability to share critical data with heirs and other beneficiaries. The estate planning process should include services such as an inventory of assets, as well as all the instructions and credentials to locate and access them.

SUMMARY

A estate planning and beneficiary management system according to an embodiment includes a system controller which may prompt and receive from a user information which may be necessary to create and estate planning model. The information may be organized into suites, including a legal suite for information relating to legal documents and directives, a legacy suite for information relating to user legacy information, a digital suite for information passwords and digital asset access information, and a financial suite for information to store traditional and digital assets.

The information may be organized into different modules in the suites, and stored in databases on a system platform. The platform may include other modules, systems, and engines. A system controller controls information and instructions to the modules, systems, and engines from the databases and other memories. The system controller also controls communications with the user and other outside parties and entities. These may include beneficiaries and trusted contacts, attorneys, fiduciaries, and outside world platforms including, for example, exchanges, social platforms, and subscription services.

The user may select beneficiaries and trusted contacts to provide access to certain information in the platform. The user may assign different permission or access levels for various selected documents to the beneficiaries and trusted contacts.

The platform may provide the user with an overview of their estate, and enable the user to update the information in the databases as necessary. The system may also monitor various accounts and notify the user of changes. The platform also provides beneficiaries and trusted contacts more transparency regarding the user's estate, depending on the permission level(s) they have been assigned.

The system may generate smart contracts to lay out distribution of digital assets including cryptocurrency and NFTs, and code how the assets will be distributed in the event of the user's demise. The smart contracts may utilize warm and cold wallets to control the transactions.

The system may monitor for a triggering event, such as death or incapacitation, and once a triggering event is detected and verified, message the beneficiaries and trusted contacts. The system may also automatically execute the instructions in the smart contracts to perform transactions between the user's wallets and the beneficiaries wallets. The system may also automatically notify outside world platforms of the user's death and directives for the individual platform laid out in the user's will.

DETAILED DESCRIPTION

Figure 1:
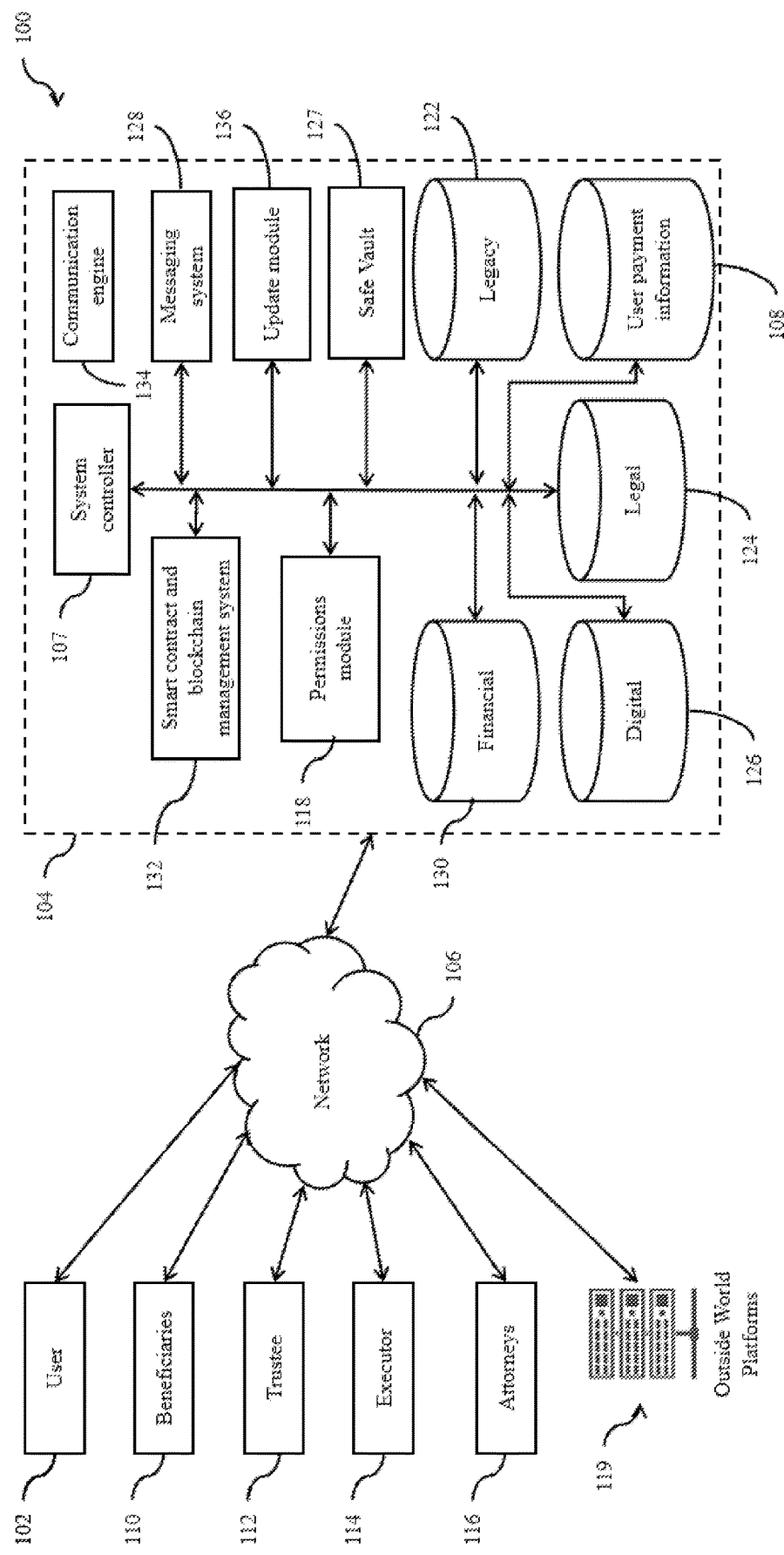
FIG. 1 is a system diagram of a estate planning and beneficiary management system according to an embodiment

FIG. 1 shows an estate planning and beneficiary management system 100 designed to streamline the legacy transfer process for physical and digital assets, with the sharing of critical information to beneficiaries and digital asset custodians, social platforms, and cryptocurrency and NFT exchanges.

A user 102 who wants to use the system 100 may communicate with a system platform 104 via a network 106. The user 102 may access a website associated with the system, and explore the various services, FAQs, company information, etc., provided by the site.

The website may be generated by a system controller 107 which also manages the other modules and databases in the system platform. The system controller may communication with entities outside of the system platform via the network 106. The controller may write to and read from the various databases and memories. The controller may also control transmission of data to the various service modules in the system platform and provide commands for performing various operations as necessary.

Figure 2A:
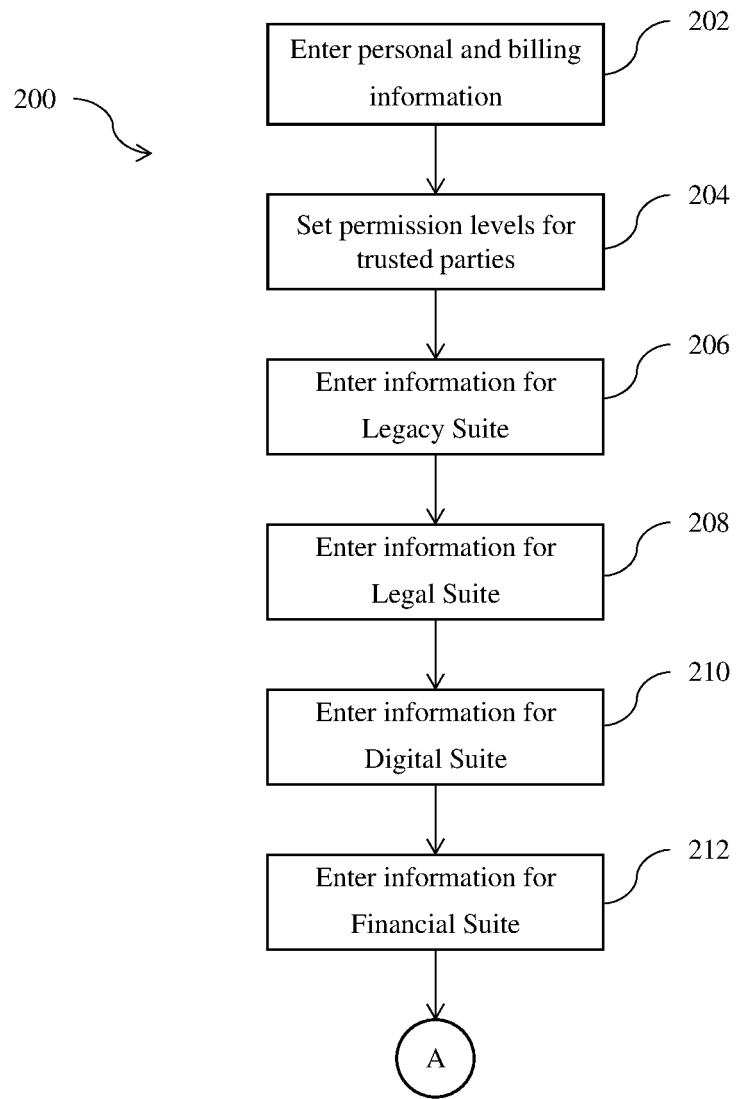
FIGS. 2A and 2B show a flowchart describing a user sign-up operation according to an embodiment.
Figure 2B:
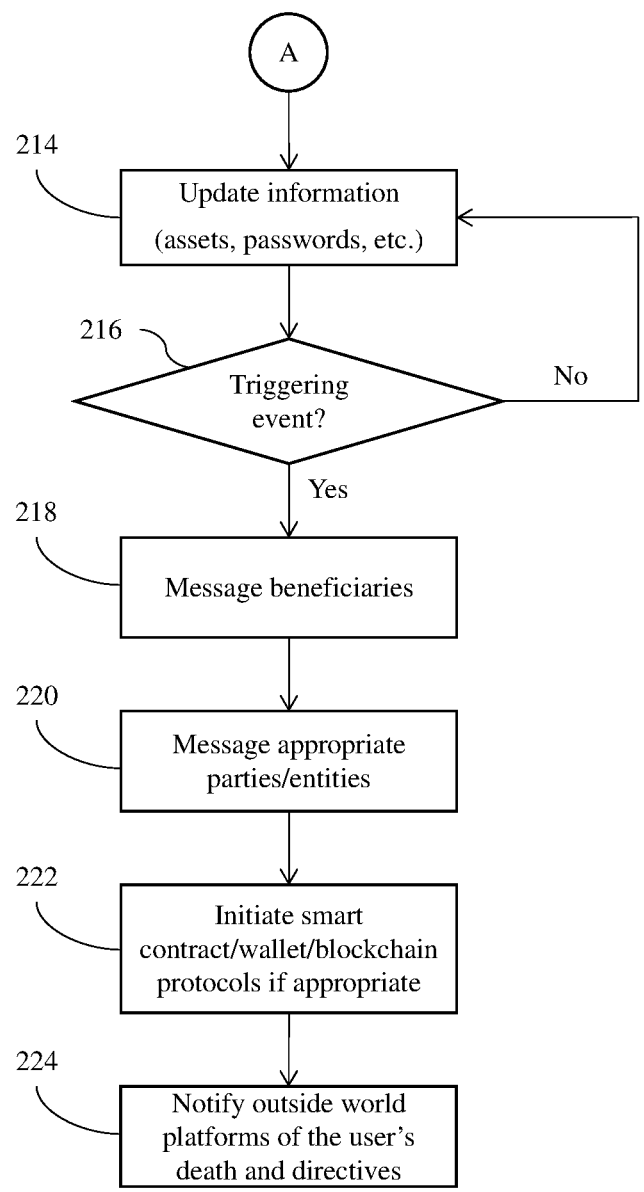

FIGS. 2A and 2B show a user sign-up operation 200 according to an embodiment. The user 102 may subscribe to or purchase services offered by the system platform 104. The user may enter personal and payment information, which is stored in a user payment database 108 at the system platform (block 202).

Once membership in the system is established, various web pages may be provided to the user to collect information necessary to prepare an estate planning model for the user. This may include a page requesting contact information and permission, or access, levels for trusted parties (block 204), for example, potential beneficiary(-ies) 110, trustee(s) 112, executor 114, and attorney(s) 116. This information may be stored at and utilized by a permissions module 118 at the system platform.

Figure 7:
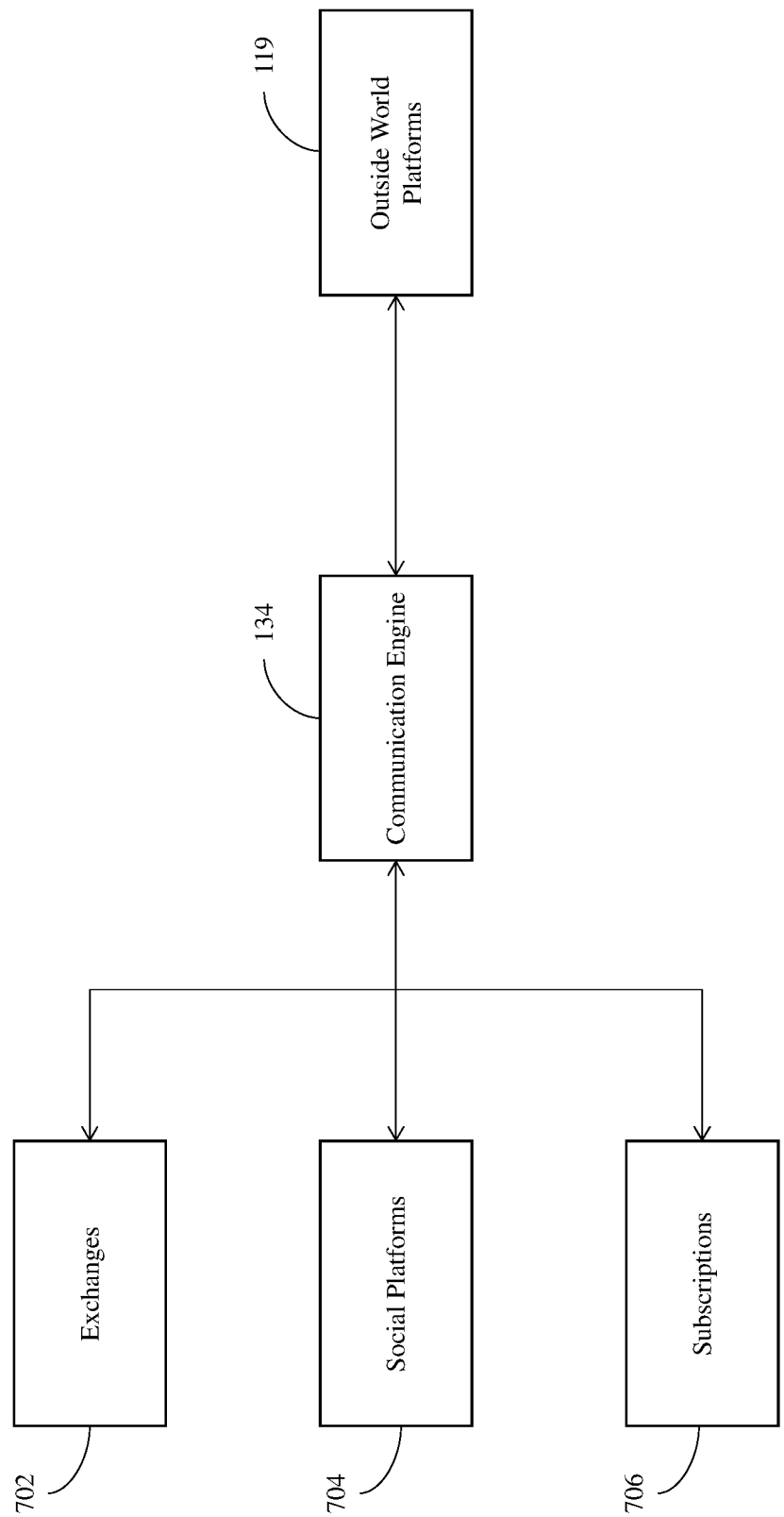
FIG. 7 shows a system for notifying outside world platforms of the user's death and directives regarding their services according to an embodiment.

The system platform 104 may also communicate with outside world platforms 119 including, for example, exchanges, social platforms, and subscriptions, which is described in relation to FIG. 7 below.

Figure 3A:
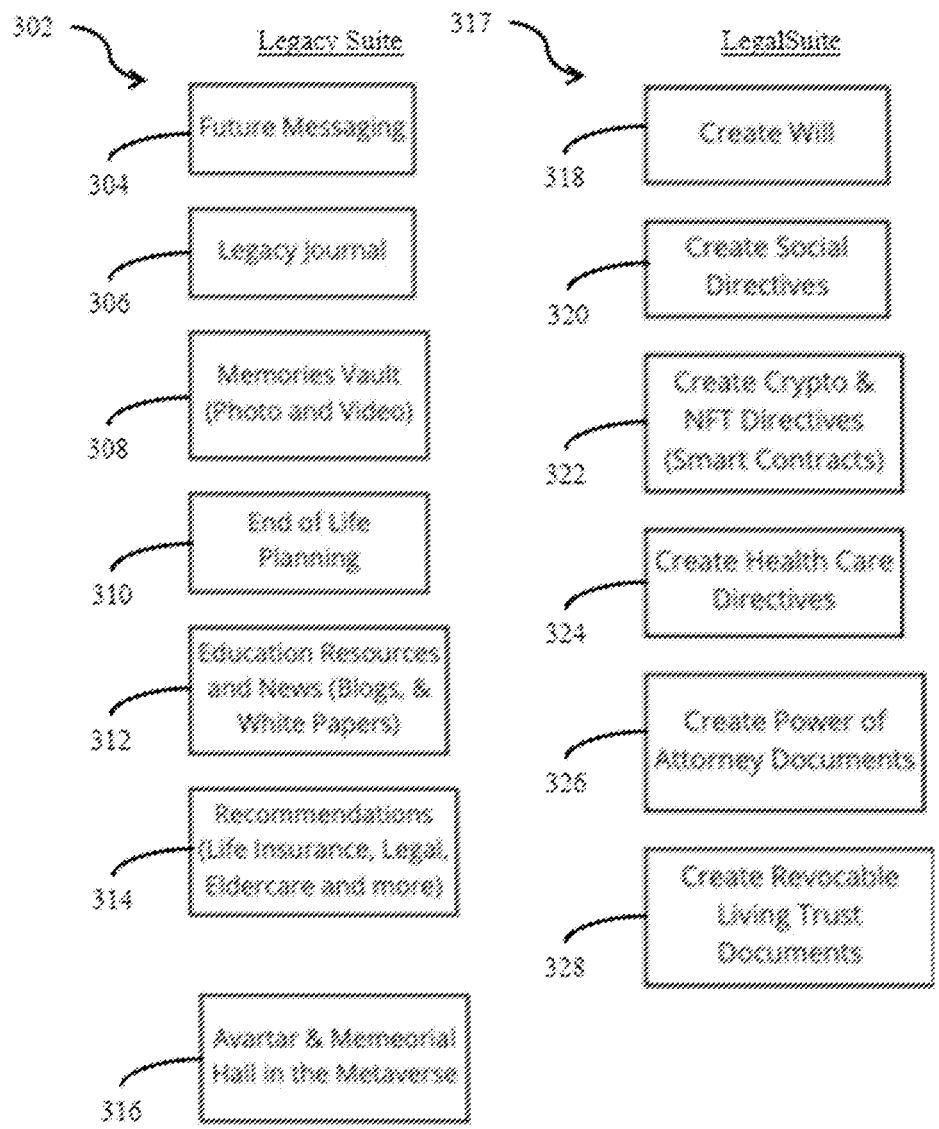
FIGS. 3A and 3B shows different modules organized into suites according to an embodiment.
Figure 3B:
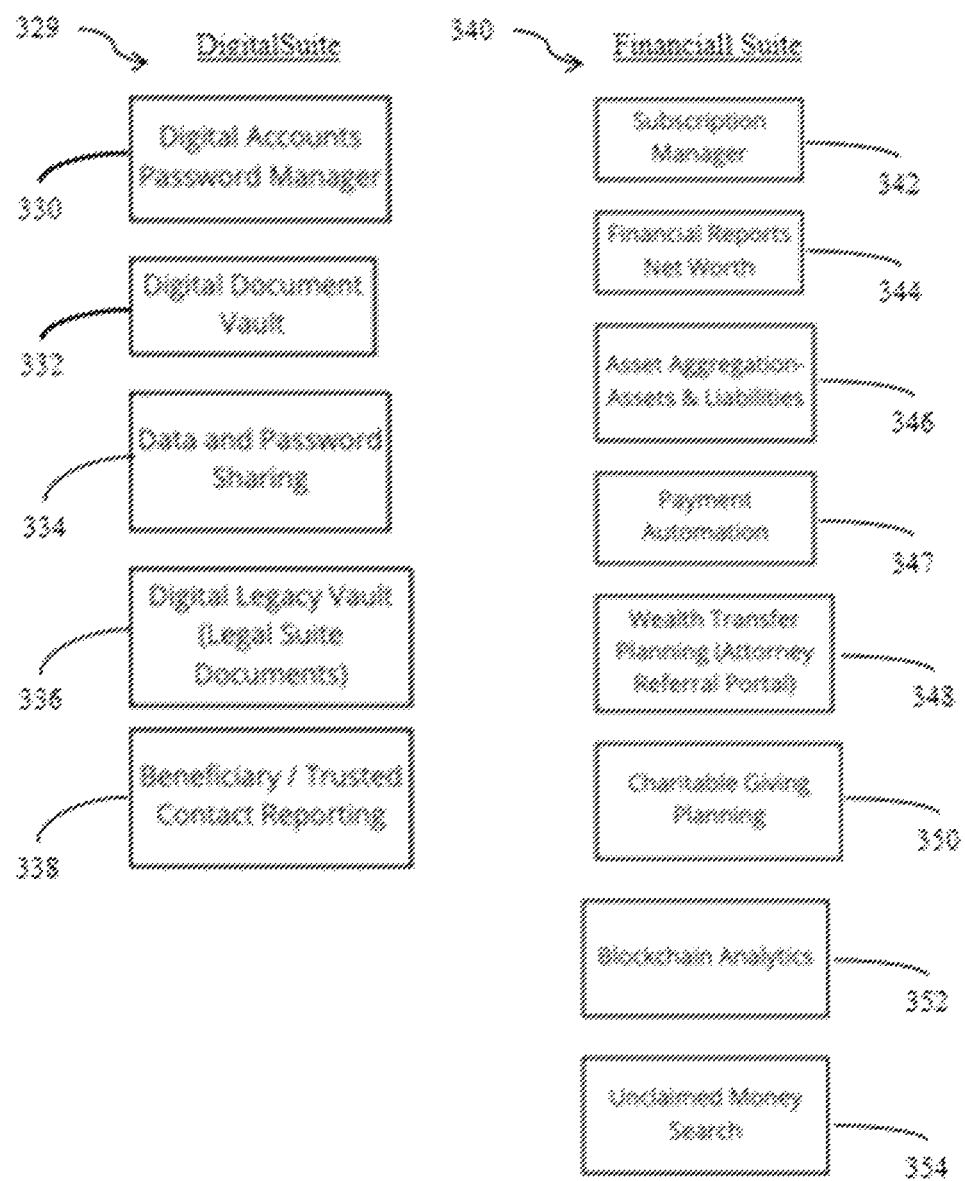

The user may enter information for the various service modules which may be organized into suites, as shown in FIGS. 3A and 3B. The system website may prompt the user for information, including the uploading of documents and other type of files, to populate the service modules and develop a estate planning model for the user.

In an embodiment, the system website may prompt the user to enter information for modules of a legacy suite 302 (block 206). This information may be stored in a legacy database 122 in the system platform.

A future messaging module 304 may enable the user to send a digital time capsule on a specific date, for example, on a loved one's birthday or anniversary, before or after the user has passed away. The user may specify the date for the message to be sent and the recipients' electronic address (e.g., email, or social platform page). The digital time capsule may include, for example, photos, recorded videos, songs, and personalized messages. A legacy journal 306 may be used for documenting key events, milestones and achievements in the user's life. A memory vault 308 may provide secure file storage for images, videos, and music.

An end-of-life planning module 310 may provide the user with funeral planning and advance directives options. The module may prompt the user to provide specific instructions on how the user would like final services handled and how they would like to be eulogized. An education resources module 312 may prompt the user to identify, for example, blogs, white papers, and other materials the user considers important. A recommendations module 314 may provide the user with recommendations regarding life insurance, legal consideration, and eldercare. An avatar and memorial hall module 316 may enable the user to establish an avatar and vocal presence in the metaverse where the user and loved ones can visit to access memories and recordings.

The system website may prompt the user to enter information for modules of a legal suite 317 (block 208), which may be stored in a legal database 124 in the system platform.

A will creation module 318 may prompt the user for information which may be used to create a last will and testament. A social directives creation module 320 may enable the user to choose which sites and social media platforms the user would like to have deleted, memorialized, or made accessible. A digital inheritance module 322 may prompt the user for information regarding digital assets, for example, NFT, cryptocurrency, and blockchain. A health care directives creation module 324 may prompt the user to specify which actions should be taken for their health the user is no longer able to make decisions for themselves due to of illness or incapacity. A power of attorney creation module 326 may be used to store power of attorney documents. A revocable living trust creation module 328 may be used to store revocable living trust documents.

The system website may prompt the user to enter information for modules of a digital suite 329 (block 210), which may be stored in a digital database 126 in the system platform.

A digital accounts and password manager 330 may prompt the user for passwords and account access details for safeguarding in a Safe Vault 126 at the system platform 104. The module and Safe Vault enable the user to securely store and manage all of their login credentials and account details. A digital document vault 332 may be used for secure and encrypted file storage in which the user can store or backup their most important files, for example, birth certificates and financial records. A data and password sharing module 334 enables the user to transfer important files to a beneficiary or trusted contact through the digital document vault using complete end-to-end encryption, and provides when the files are downloaded. A digital legacy vault 336 may provide secure and encrypted file storage for legal documents, for example, contracts, agreements, will, healthcare directives, trust documents, power of attorney, living trust and cryptocurrency and NFT directives.

The Safe Vault may include tools to help users securely store and manage all of their login credentials. The user may securely store asset and investment account information, credit and debit card account information, online banking information, and information for other accounts, such as PayPal. The user may store PINs, credit card numbers, online banking credentials, etc., in the vault's password manager, and access it securely from anywhere on a computer or mobile device. This information is stored in a centralized vault for the user's account.

In an embodiment, security may include AES-256 bit encryption and multiple techniques to protect the user's data at rest and in transit. With a built-in "SecureViewer" function, the user may view PDF files, images, and other document types without leaving a digital trace. This function may be particularly useful if the user needs to view highly sensitive information securely.

A two-factor authentication may also be a selectable security option for access to the system platform 104. With strong SMS authentication, your the user's login information remains secure even if, for example, the user's password is discovered by a hacker. The login may be protected by an additional code, which may be sent, e.g., by text message, when the user logs in to the system. The user's information may be accessed through any web browser, but for convenience, there may also be applications that can be installed directly on the user's devices. These may include, for example, applications for Windows, OSX, iOS, and/or Android that will allow the user secure access to their information.

Figure 4:
FIG. 4 shows an exemplary system web page for inviting beneficiaries and trusted contacts.
Figure 5:
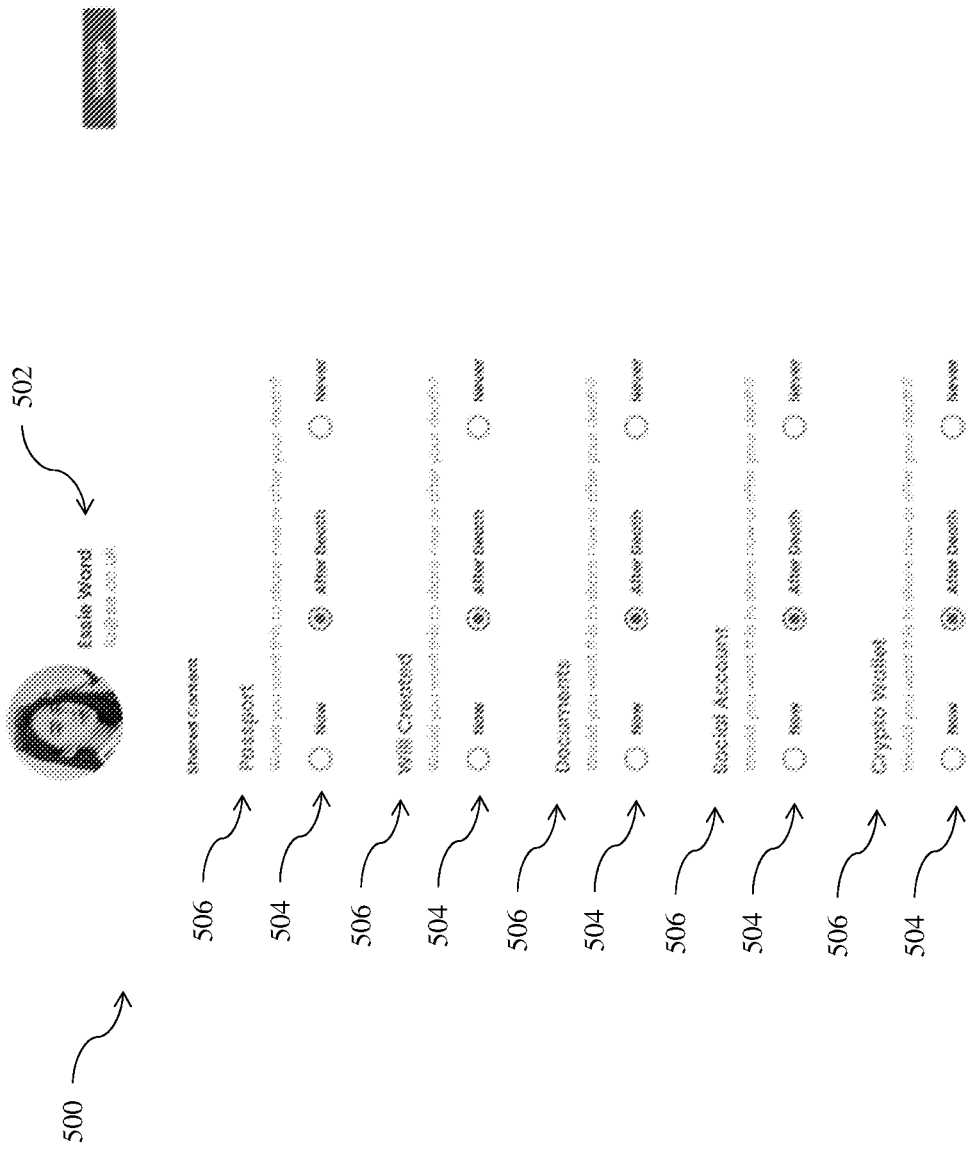
FIG. 5 shows an exemplary system web page for setting beneficiary and trusted contact access levels.

For each of the modules in the various suites, the user may assign access levels for beneficiaries and trusted contacts for each account and file. FIG. 4 shows an exemplary system web page 400 in which the user may invite trusted contacts 402 and identify the number of documents 404 they may have access to. This may link to the web page 500 shown in FIG. 5, which enables the user to set access levels for different documents. FIG. 5 shows an exemplary system web page 500 for setting beneficiary and trusted contact access levels. For each beneficiary or trusted contact 502, the user may select an access level 504 (e.g., "after death") for a particular document 506 (e.g., passport). A beneficiary/trusted contact reporting module 338 may report changes to the various documents to the beneficiaries and trusted contacts based on their access level via a messaging system at the system platform 104.

The system website may prompt the user to enter information for modules of a financial suite 340 (block 212), which may be stored in a financial database 130 in the system platform.

A subscription manager 342 may be used to record an inventory of subscriptions and access information so beneficiaries or trusted contacts can manage subscription assignments as outlined in legal directives. A financial reports module 344 may provide a user with financial snapshot of net worth and provide a summary of current financial affairs. An asset aggregation module 346 may link assets and liabilities for personal and business accounts and provide instructions for asset transfers. An automated payment module 347 may enable the user to create scheduled automatic payments from the trust account, which may be processed through a secure online system.

A wealth transfer planning module 348 may act as a referral system to an attorney who would may be able to provide counseling for more personalized and complex needs. A charitable giving module 350 may enable the user to make charitable contributions from a trust. A blockchain analytics module 352 may identify investment opportunities in cryptocurrency markets. An unclaimed money search module 354 may access various records databases to identify unclaimed money in the user's name.

With the information entered during the sign up operation 200, the information needed to identify and access the user's physical and non-physical assets may be stored centrally at the system for future review, updating, and eventually, distribution. This may be used to guide beneficiaries, providing a clear road map for access as provided and instructed by user.

For physical assets, such as jewelry, art, automobiles, collectibles, etc., this information may include the physical location of the asset and, in certain cases, the physical location of a proof of ownership, such as a certificate of title for an automobile.

For financial instruments and financial products such stocks, bonds, life insurance policies, bank accounts, loans, mortgages, etc., this information may include the location of documents, and for those with an online presence, website addresses, passwords, login ids, and secondary verification information, e.g., challenge questions, for accessing the documents.

For digital assets, the system may use wallets (hot, warm, cold) and smart contracts to manage their inheritance in a much more reliable and confident manner. The goal of a blockchain smart contract is to simplify business and trade between both anonymous and identified parties, sometimes without the need for a middleman. A smart contract scales down on formality and costs associated with traditional methods, without compromising on authenticity and credibility. The use of smart contracts enable the system to offer complete transparency and eliminate the possibility of modifications once the contract is made, offering the user the ability to hide their assets and wishes behind a solid wall of security.

Furthermore, blockchain technology makes it almost impossible to forge records. These factors enable the system to avoid problems such as inheritance theft. Inheritance theft can take many forms, ranging from manipulating the person's wishes while they're still alive, to theft and embezzlement that occurs after the death. To eliminate such threats, the system enables a class of smart contracts which allows for the removal of any and all intermediary legal parties, i.e., lawyers and law firms, if desired, while distributing the user's estate.

Figure 6:
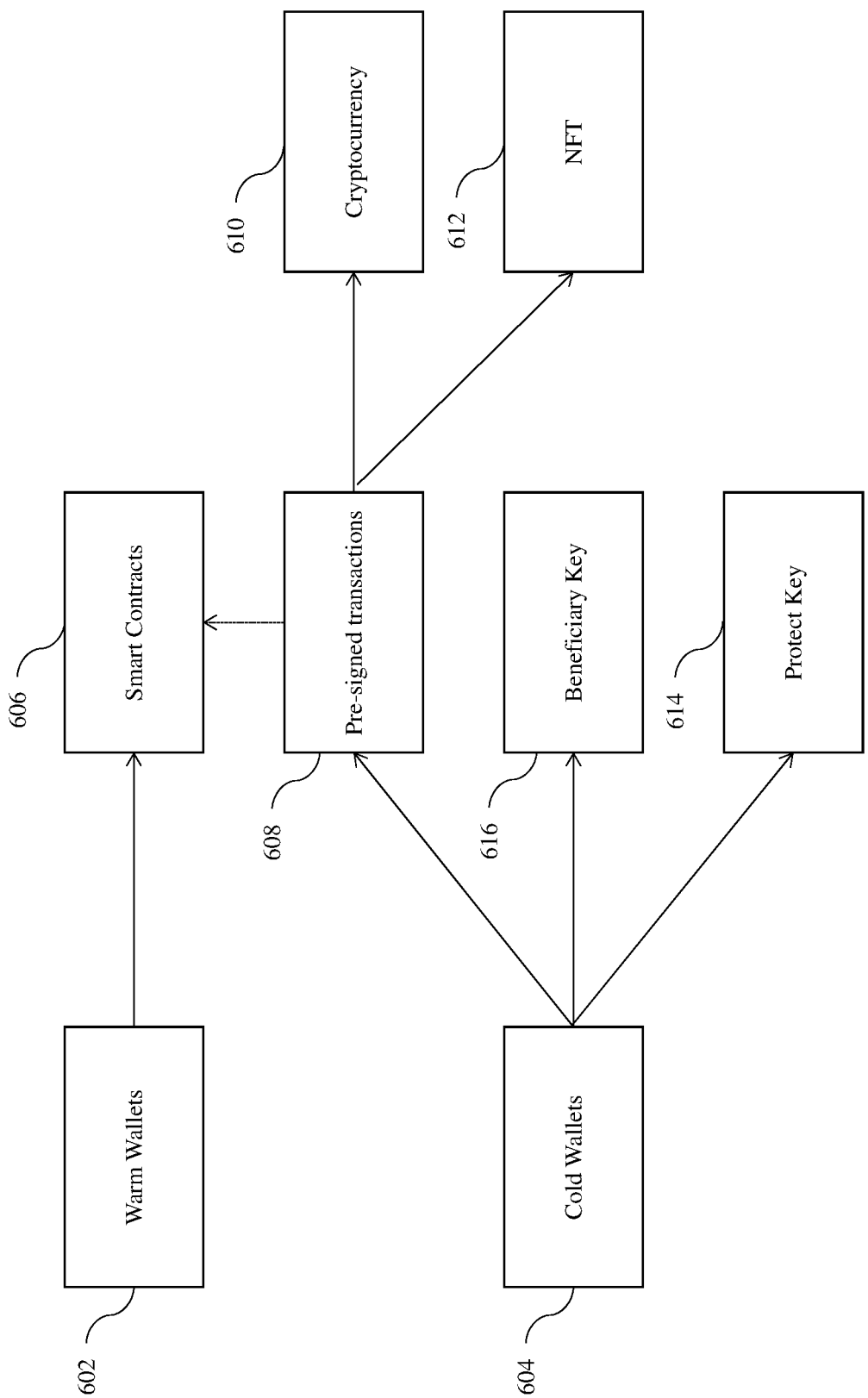
FIG. 6 shows how wallets and smart contracts interact in the system according to an embodiment.

FIG. 6 shows how warm wallets 602, cold wallets 604 and smart contracts 606 interact in the system according to an embodiment. De-centralized cryptocurrency exchanges such as TrustWallet and Metamask may use wallets to store and perform cryptocurrency transactions. For example, TrustWallet is software that generates wallet addresses and encrypted private keys that may be used to send and receive Ethereum and other cryptographically secured tokens (or "virtual currency"), allows users to browse third party decentralized applications ("DApps") through the mobile application's DApp browser, and facilitates the submission of virtual currency transaction data to Ethereum-based blockchains without requiring the user to download or install the associated Ethereum-based software to their local device. A private key is connected to the wallet address and together they can be used to authorize the transfer of virtual currency to and from that wallet address.

In an embodiment, the system platform may support of multiple types of blockchains, such as Solana, which are not Ethereum-based. This may be enable cross-chain asset management.

The system 100 may use smart contracts 606 to control asset distribution. The user can designate how much from each of their wallets should be distributed to one or more beneficiaries' wallets, and the system can code that into a smart contract. The smart contracts may be administered by a smart contract and blockchain management system 132 at the system platform 104.

Hot wallets, or software wallets, are cryptocurrency wallets that are always connected to the internet and cryptocurrency network. Warm wallets are digital asset storage systems that function much like hot wallets, their main difference being that they are usually software that is downloadable, unlike the hot wallets offered by most exchanges, and usually require the use of 12-digit passcodes or PIN numbers for its user authentication mechanism rather than passwords set up on the exchange, like hot wallets. Since warm wallets are always connected to the internet, the system may create smart contracts 606 based on transactions set up by the user on the system website.

A cold wallet, otherwise known as a hardware wallet, is a physical device that keeps cryptocurrency completely offline. Since cold wallets are offline, pre-signed transactions 608 are necessary to create a smart contract, as well as perform cryptocurrency 610 and NFT 612 transactions. A private key and public key are necessary to access the cold wallet. A protect key 614 may be the original private key held by the user. A beneficiary 616 key may be a copy of the user's private key.

With regards to NFT transfers, as mentioned above, blockchain technology makes it almost impossible to forge records, ensuring that the purchaser of an NFT holds a token representing sole ownership of the original work that he or she has purchased. Because each NFT is unique, they cannot be traded for equal value like cryptocurrency or traditional forms of currency are traded. In the overwhelming majority of instances, NFTs can only be accessed using a password or a personal key. In order to access the user's NFT(s), this information must be passed on to future beneficiaries.

Individuals seeking to pass on cryptocurrency, NFTs, and other online assets should document a "digital legacy" to accurately describe important account details and store information about how to access the assets within these accounts. The user may have the ability to store sensitive information in the password vault, however if they are not comfortable doing so, the user would need to provide the location of where they stored the cold wallet and the location of where they maintain the key to share with an executor upon death.

The process of storing the digital will and distributing digital assets may operate "on-chain", that is, through blockchain processes, and be decentralized in a way that all of these processes may be performed with or without the dApp through smart contracts. All the other modules, for example, social platforms, centralized exchanges, subscription services, etc., may only operate off-chain through the system platform.

The information related to user's digital will, including cryptocurrency accounts and NFTs, for their hot wallets may be on chain with proportions of distribution to their relevant beneficiaries. The user will provide the beneficiaries' wallet addresses, and the percentage or value of the tokens to be transferred, e.g, ERC20 (cryptocurrency), ERC721 (NFT), or ERC1155 (multi-token). The digital will require user to pre-sign the transactions, and upon their death, the assets will be open to claim on the beneficiaries' end. The system may support all EVM based blockchain assets and Solana.

The NFTs will only have atomic values and not percentages as may be available with cryptocurrency accounts. The verification process may require a court legal order and the executor (human or platform-based, e.g., a "digital executor") to trigger the process of legacy transfer.

Crypto assets including NFTs may have two main destinations; one being the user-designated beneficiaries and the other being a back up wallet created from platform's wallet service, which can be used to protect Crypto assets in case of any panic situation or in case the user loses or forgets their current wallet credentials.

Having the different components of the digital will, e.g., an "NFT will" and "crypto will" on-chain in the shape of smart contracts gives full transparency and control to the user, ensuring no third party is involved in the process.

In an embodiment, the system may include a communication engine 134 (FIG. 1), which may be in communication with the various outside world platforms. Information for these platforms, including exchanges 702, social platforms 704, and subscription services 706, may be provided by the user and stored in databases in the various suites. These platforms 119 may include for example, platforms such as Binance, Coinbase, Kraken, Facebook, Instagram, Snapchat, TikTok, Netflix, Amazon Prime, etc. The communication engine 134 may deal with the relevant resources in these platforms and provide all the required documents and detailed will directives to verify the event of death and the user's wishes laid out in the user's will surrounding around these platforms, including access by any beneficiaries that they had assigned.

The state of a person's estate will likely change significantly over the life of the estate plan, for example, due to changes is asset portfolios, health insurance policies, marriages and divorces, deaths and births of people close to the person, and laws, for example, tax considerations, which may change over time, and differences due to the testator moving to a different state or country. Furthermore, over time physical assets may be acquired, sold or donated, or lost, and investment portfolios may increase or decrease in value.

The user may update the information in the system platform (block 214, FIG. 2B) as it changes over time. This may include updating financial information, as well as adding and removing beneficiaries, changing passwords as necessary, adding or deleting documents and media and other digital content, etc. The user may communicate these changes to the system platform 104, which may make these changes using an update module 136. Depending on the user's service package and access provided by the user to the system, the update module 136 may monitor entities with online presences, such as banks and cryptocurrency exchanges, and notify the user of changes to their portfolio. The messaging system 128 may also notify beneficiaries and trusted contacts as documents are modified by the user, depending on their access level. This provides visibility to the user of their overall estate, and transparency to beneficiaries and trusted contacts as documents are added, deleted, or modified.

The system platform may monitor for a triggering event, such as death or incapacitation (block 216). For example, the distribution process may be triggered automatically once the user doesn't respond to a scheduled check-in confirming they are still alive and well.

If such an event is detected, the system may wait for verification. Upon verification, the system may message the beneficiaries, trusted contacts, and other appropriate parties/entities (blocks 218 and 220, respectively). The system may have the capability to provide digital asset notification to any jurisdictional authority dealing with matters of probate and the administration of estates if the executor or digital executor needs to provide such information to those authorities.

The smart contract and blockchain management system 132 may automatically execute the transactions as provided for in the smart contracts (block 222), However, beneficiaries may be required to claim the assets rather than just directly transfer into their wallets. The communication engine 134 would notify the outside world platforms (block 224) in accordance to their communication channel which they have outlined on their site for death notifications.

Various aspects of the embodiments of the system described above could also be used for one-stop storage for important documents, a secure storage platform, as well as a financial management platform with features like asset aggregation and net worth reporting. The analytics provided by the system platform for blockchain assets such as NFTs and cryptocurrencies may also be helpful for investors.

The foregoing method descriptions and diagrams/figures are provided merely as illustrative examples and are not intended to require or imply that the operations of various aspects must be performed in the order presented. As will be appreciated by one of skill in the art, the order of operations in the aspects described herein may be performed in any order. Words such as "thereafter," "then," "next," etc. are not intended to limit the order of the operations; such words are used to guide the reader through the description of the methods and systems described herein. Further, any reference to claim elements in the singular, for example, using the articles "a," "an," or "the" is not to be construed as limiting the element to the singular.

Various illustrative logical blocks, modules, components, circuits, and algorithm operations described in connection with the aspects described herein may be implemented as electronic hardware, computer software, or combinations of both. To clearly illustrate this interchangeability of hardware and software, various illustrative components, blocks, modules, circuits, operations, etc. have been described herein generally in terms of their functionality. Whether such functionality is implemented as hardware or software depends upon the particular application and design constraints imposed on the overall system. One of skill in the art may implement the described functionality in varying ways for each particular application, but such implementation decisions should not be interpreted as causing a departure from the scope of the claims.

The hardware used to implement various illustrative logics, logical blocks, modules, components, circuits, etc. described in connection with the aspects described herein may be implemented or performed with a general purpose processor, a digital signal processor ("DSP"), an application specific integrated circuit ("ASIC"), a field programmable gate array ("FPGA") or other programmable logic device, discrete gate logic, transistor logic, discrete hardware components, or any combination thereof designed to perform the functions described herein. A general-purpose processor may be a microprocessor, a controller, a microcontroller, a state machine, etc. A processor may also be implemented as a combination of receiver smart objects, e.g., a combination of a DSP and a microprocessor, a plurality of microprocessors, one or more microprocessors in conjunction with a DSP core, or any other such like configuration. Alternatively, some operations or methods may be performed by circuitry that is specific to a given function.

In one or more aspects, the functions described may be implemented in hardware, software, firmware, or any combination thereof. If implemented in software, the functions may be stored as one or more instructions (or code) on a non-transitory computer-readable storage medium or a non-transitory processor-readable storage medium. The operations of a method or algorithm disclosed herein may be embodied in a processor-executable software module or as processor-executable instructions, both of which may reside on a non-transitory computer-readable or processor-readable storage medium. Non-transitory computer-readable or processor-readable storage media may be any storage media that may be accessed by a computer or a processor (e.g., RAM, flash, etc.). By way of example but not limitation, such non-transitory computer-readable or processor-readable storage media may include RAM, ROM, EEPROM, NAND FLASH, NOR FLASH, M-RAM, P-RAM, R-RAM, CD-ROM, DVD, magnetic disk storage, magnetic storage smart objects, or any other medium that may be used to store program code in the form of instructions or data structures and that may be accessed by a computer. Disk as used herein may refer to magnetic or non-magnetic storage operable to store instructions or code. Disc refers to any optical disc operable to store instructions or code. Combinations of any of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed aspects is provided to enable any person skilled in the art to make, implement, or use the claims. Various modifications to these aspects will be readily apparent to those skilled in the art, and the generic principles defined herein may be applied to other aspects without departing from the scope of the claims. Thus, the present disclosure is not intended to be limited to the aspects illustrated herein but is to be accorded the widest scope consistent with the claims disclosed herein.

The invention claimed is:

1. A centralized estate planning system comprising:
   a system controller;
   a plurality of databases including
      a legal database that store legal documents and directives,
      a legacy database that store user legacy information,
      a digital database that store one or more user passwords and digital asset access information, and
      a financial database that store asset information;
   a permissions module;
   an update module;
   a messaging system that manages reporting;
   a smart contract management system; and
   a non-transitory memory containing instructions when executed by the system controller causes the system controller to perform the steps of:
      receiving, by the update module, updated asset information from the system controller;
      storing, by the update module, the received updated asset information from the system controller;
      monitoring, by the update module, the assets in one or more outside accounts using the stored user password and asset information;
      determining, by the update module, a change to said assets in the said one or more outside accounts;
      based on a determination, by the update module, a change to said assets in the said one or more outside accounts, notifying the user of changes to said assets in said one or more outside accounts;
      receiving, by the system controller, user inputs;
      forwarding, by the system controller, to the smart contract management system, the received user inputs;
      receiving, by the smart contract management system, the forwarded user inputs;
      generating, by the smart contract management system, code that create one or more smart contracts based on the received user inputs;
      managing, by the smart contract management system, blockchain protocols for one or more smart contracts and one or more wallets;
      exchanging, by the system controller, data between the databases and modules; and
      monitoring, by the system controller, scheduled check-ins for a trigger event.

2. The system of claim 1, wherein in the event the system controller detects and verifies a triggering event, the messaging system sends a notification to one or more user-identified beneficiaries and trusted contacts.

3. The system of claim 1, wherein in the event the system controller detects and verifies a triggering event, the smart contract management system automatically executes transactions between the one or more wallets and one or more beneficiary wallets as defined in the smart contracts.

4. The system of claim 1, further comprising a communication engine in communication with one or more outside world platforms, and in the event the system controller detects and verifies a triggering event, the communication engine automatically notifies said one or more outside world platforms of the triggering event and user-defined directives for said outside world platform.

5. The system of claim 1, further comprising a safe vault including a memory to store keys and addresses for the one or more wallets.

6. The system of claim 1, wherein the permission module is operative to receive user commands to provide one of a plurality of permission levels for one or more beneficiaries or trusted contacts for each of a plurality of documents.

7. A non-transitory computer-readable medium having stored thereon computer-readable instructions, which when executed, cause at least one processor to:
    store legal documents and directives on a legal database;
    store user legacy information on a legacy database;
    store one or more user passwords and digital asset access information on a digital database;
    store asset information on a financial database;
    manage permissions for one or more non-users to access information in one or more of said databases;
    receive updated asset information;
    store the received updated asset information;
    monitor the assets in one or more outside accounts using the stored user password and asset information;
    determine a change to said assets in the said one or more outside accounts;
    based on a determination a change to said assets in the said one or more outside accounts, notify the user of changes to said assets in said one or more outside accounts;
    manage reporting to one or more of said non-users;
    receive user inputs;
    generate code that create one or more smart contracts based on the received user inputs;
    manage blockchain protocols for one or more smart contracts and one or more wallets;
    exchange data between the databases and an update module and an permissions module; and
    monitor scheduled check-ins for a trigger event.

8. The non-transitory computer-readable medium of claim 7, in the event a triggering event is detected and verified, the at least one processor if further operative to send a notification to one or more user-identified beneficiaries and trusted contacts.

9. The non-transitory computer-readable medium of claim 7, wherein in the event a triggering event is detected and verified, the at least one processor if further operative to automatically execute transactions between the one or more wallets and one or more beneficiary wallets as defined in the smart contracts.

10. The non-transitory computer-readable medium of claim 7, wherein in the event a triggering event is detected and verified, the at least one processor if further operative to automatically notify one or more outside world platforms of the triggering event and user-defined directives for said outside word platform.

11. The non-transitory computer-readable medium of claim 7, wherein the at least one processor if further operative to store keys and addresses for the one or more wallets.

12. The non-transitory computer-readable medium of claim 7, wherein the at least one processor if further operative to receive user commands to provide one of a plurality of permission levels for one or more beneficiaries or trusted contacts for each of a plurality of documents.

\* \* \* \* \*